United States Patent
Wolf

(10) Patent No.: US 8,116,385 B2
(45) Date of Patent: Feb. 14, 2012

(54) METHOD FOR THE TRANSMISSION OF A DATA WORD

(76) Inventor: Andreas Christian Wolf, Teltow (DE)

( * ) Notice: Subject to any disclaimer, the term of this patent is extended or adjusted under 35 U.S.C. 154(b) by 1660 days.

(21) Appl. No.: 10/541,508

(22) PCT Filed: Jan. 10, 2004

(86) PCT No.: PCT/DE2004/000047
§ 371 (c)(1),
(2), (4) Date: May 30, 2006

(87) PCT Pub. No.: WO2004/064279
PCT Pub. Date: Jul. 29, 2004

(65) Prior Publication Data
US 2006/0256850 A1    Nov. 16, 2006

(30) Foreign Application Priority Data
Jan. 12, 2003  (DE) .................................. 103 01 250

(51) Int. Cl.
*H04B 14/04* (2006.01)

(52) U.S. Cl. ........ 375/242; 375/239; 375/241; 375/259; 375/285; 375/316; 375/340; 375/343; 341/173

(58) Field of Classification Search .......... 375/239–242, 375/341, 346
See application file for complete search history.

(56) References Cited

U.S. PATENT DOCUMENTS
5,063,571 A    11/1991  Vancraeynest
(Continued)

FOREIGN PATENT DOCUMENTS
GB   1 372 137 A   10/1974
GB   1372137   *  10/1974

OTHER PUBLICATIONS

IEEE standard 802.15.4 (low-rate wireless personal area network) "PHY Proposal for the Low Rate 802.15.4 Standard" by Ed Callaway, Motorola Labs, (http://grouper.ieee.org/groups/802/15/index.html).

(Continued)

*Primary Examiner* — Khanh C Tran
*Assistant Examiner* — Eboni Hughes
(74) *Attorney, Agent, or Firm* — Davidson, Davidson & Kappel, LLC.

(57) ABSTRACT

A method for transmitting a data word, according to which a codeword supply (CV) is provided, the number of individual codewords (C1 ... C31) of the supply corresponding at least to the number of data positions (#1 ... #31) of the data word (DW), the codewords being formed from a basic codeword (C1) by means of cyclical shifting, and the cross correlation function of each codeword (C2 ... C31) with the basic codeword (C1) having a distinct extreme value, the position of which is characteristic of the individual codeword (C2). An individual codeword (C1) which is combined with the respective date (0) of the data position (#5) so as to obtain a combined result (VE5) relating to the individual data positions, is assigned to each data position (#1) of the data word (DW). The combined results (VE1 ... VE31) relating to the individual data positions are added in order to obtain a sum word (SW) that is cross-correlated with a reference (R) following transmission, said reference (R) corresponding to the basic codeword (C1) or being created from the basic codeword (C1) by means of cyclical shifting. The respective data (0,1) of the data word (DW), which relates to the individual data positions, is reconstructed from the position and quantity of the values of the obtained correlation function (KKF) by allocating in a fixed manner a corresponding data (0,1) to each value (−6;26).

13 Claims, 10 Drawing Sheets

Figure 1:
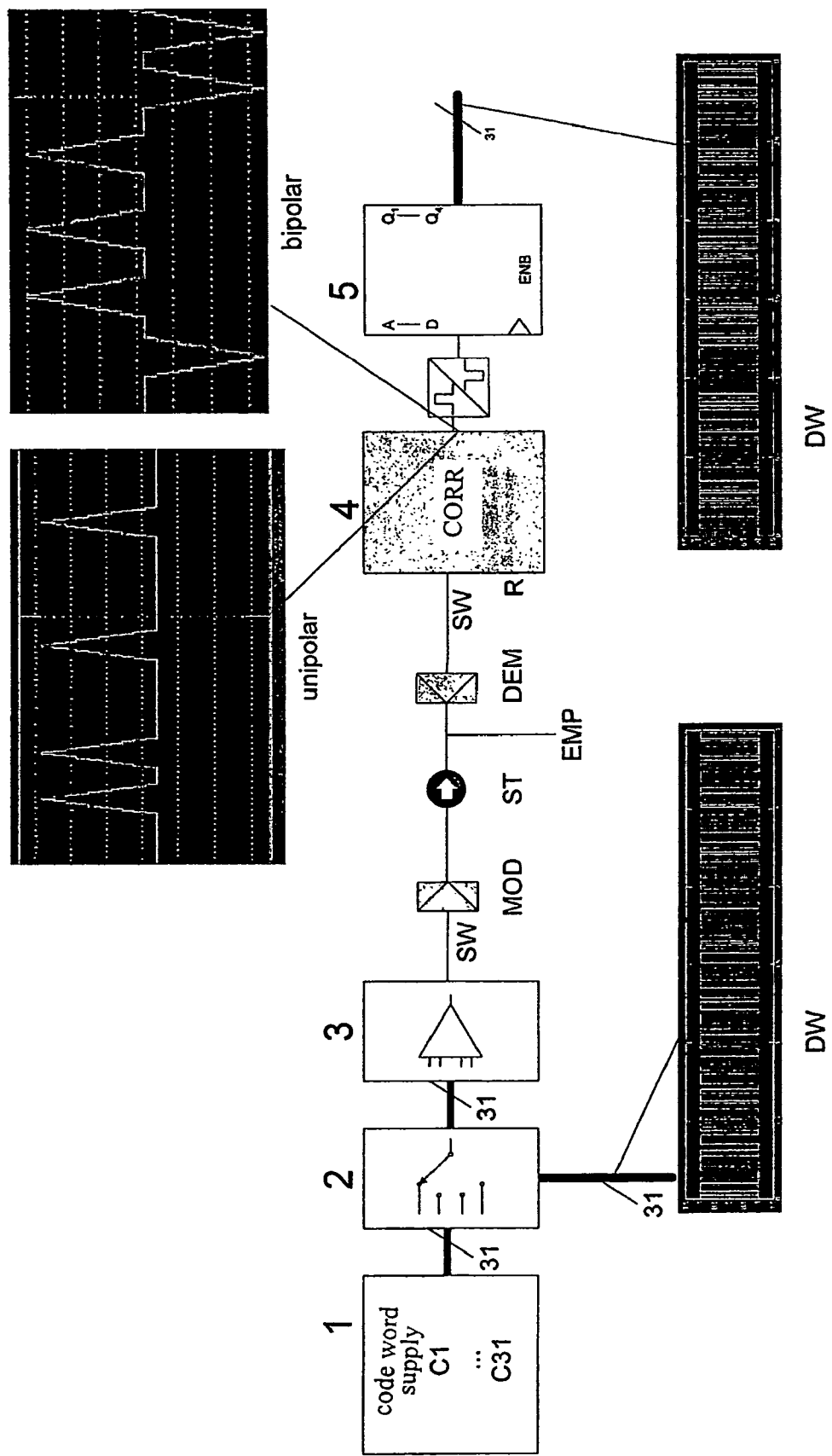

U.S. PATENT DOCUMENTS 5,504,781 A * 4/1996 Wolf .............................. 375/242
7,200,192 B2 * 4/2007 Wei et al. ....................... 375/341

OTHER PUBLICATIONS

Letaief et al. ("Multicode High-Speed Transmission for Wireless Mobile Communications"; IEEE, GLOBECOM 1995, Nov. 13-17, 1995, vol. 3, pp. 1835-1839).

Huang, Li: "The Multicode Interleaved DSSS System for High-Speed Wireless Digital Communications" (IEEE, ICC 2001, Jun. 11-14, 2001, vol. 10, pp. 2990-2994).

"Messtechnik fürdas BISDN" [Metrology for the BISDN], Dr. A. Wolf, vde publishers gmbh Berlin and Offenbach, 1992; Figure 6-13 and chapters 5 et seq.

* cited by examiner

Fig. 2a

Fig. 3a

Fig. 4a $a(n) = 0, 1, 1, 1, 0, \ldots$
$\quad\quad\quad 2^1 2^0\ 2^1 2^0\ 2^1 2^0$ mod 2

$a'(n) = 1, 3, 2, \ldots$
$\quad\quad\quad 4^0\ 4^0\ 4^0$ mod 4

Fig. 5

METHOD FOR THE TRANSMISSION OF A DATA WORD

BACKGROUND

The present invention relates to the field of data transmission through any desired medium, in particular binary signals within a band-limited radio channel, and more particularly to a method for transmitting a data word containing a sequence of individual data in sequential data positions.

The ever expanding fields of application for data transmission and increasing volumes of data to be transmitted create an increasing need for transmission methods which enable data to be transmitted at a high rate and at a low data error rate, i.e., in a manner that is highly tolerant of data transmission errors, using simple and economical means.

The important parameters that characterize the performance of present-day transmission methods are the transmission of bit/s per Hz bandwidth of the channel (channel-specific data rate) and the level of interference immunity.

Against this background, it proceeds from the realization proposal relating to the IEEE standard 802.15.4 (low-rate wireless personal area network) "PHY Proposal for the Low Rate 802.15.4 Standard" by Ed Callaway, Motorola Labs, (http://grouper.ieee.org/groups/802/15/index.html) to use sequences (code words) which are generated by the cyclical shifting of a pseudo-noise basic word. According to this proposal, a 4-bit data word is assigned to each code word. Following transmission of the code word, the original 4-bit data word can be identified from the phase position of the maximum of the correlation function by making a correlation with a code reference.

However, this method is characterized by a relatively limited performance, particularly with regard to the data rate.

A method for transmitting a data word is described in a paper by Letaief et al. ("Multicode High-Speed Transmission for Wireless Mobile Communications"; IEEE, GLOBECOM 1995, Nov. 13-17, 1995, vol. 3, pp. 1835-1839), in which an incoming data word is serial-to-parallel converted into a plurality of parallel bit data streams. For each data stream of a specific data position, the particular binary datum is linked to an individually assigned code word ("signature sequence") and subsequently carrier modulated. The modulated signals of all bit data streams are then transmitted in parallel to a receiver and appear there as summed signals. As far as the properties of the code words is concerned, it is merely elaborated that PN sequences are traditionally used in multiple access information technology. This method entails relatively substantial outlay and is limited, particularly with regard to the modulation carrier.

The paper by Huang, X; Li, Y. "The Multicode Interleaved DSSS System for High-Speed Wireless Digital Communications" (IEEE, ICC 2001, Jun. 11-14, 2001, vol. 10, pp. 2990-2994) discusses the possibility of using cyclically shifted m-sequences as code words.

SUMMARY OF THE INVENTION

An object of the present invention is to devise an efficient, high-performance data transmission method for—in particular binary—signals to be transmitted in a band-limited transmission channel that is distinguished by a high level of interference immunity and/or by a high channel-specific data rate (bit/s/Hz). Moreover, the method should be able to be implemented using inexpensive and uncomplicated means.

Linking in the context of the present invention is understood to be an at least multiplicative coupling of the particular code word assigned to the data position, with the data position-specific datum, it also being possible for a scaling or weighting of the multiplication operation to be carried out. Such a combinatorial operation is carried out using known analog multiplication processes; in a digital realization of the method, the multiplication may be preferably performed by an EX-OR-NOT operation (negated EX-OR operation).

The individual combination results are added, for example, by summing the analog signals representing the particular combination result. When the method is carried out in a digital process, the digital signals may be summed on a bit-position basis.

A first, fundamentally important aspect of the present invention is that the particular combination result—obtained by combining the code word individually assigned to the particular individual data position, with the particular content of this data position (in the following, also referred to as datum)—is added to the remaining combination results of the remaining data positions. In this manner, a characteristic sum word is produced that is able to be transmitted to the receiver in a highly error-tolerant manner, over any desired transmission links, preferably by radio transmission.

The original information on the data word to be transmitted remains implicitly contained in the sum word and is extracted on the receiver side, in accordance with the method of the present invention. To that end, the sum word is cross-correlated with the particular reference, in the case of two or more sets of code supplies, as set forth in claim 8. In the process, significant (extreme) values occur in the cross-correlation function(s) (claim 8), whose position and magnitude indicate which datum is present at the data position in the data word corresponding to the position of the value.

The information required for that purpose on the receiver side may be made available in different ways. It is conceivable, for example, for data positions for information in this regard to be reserved in each data word, for example. Thus, for example, the first two data positions of a digital data word could be filled with the highest and, respectively, lowest value of the value set provided for the data word. The corresponding cross-correlation function values of the transmitted sum word are then indicative of the maximal and, respectively, minimal values of the cross-correlation function; between these lie then, in accordance with the priority of the data word, further "bands" in which possible additional values of the data word are represented by corresponding values of the cross-correlation function.

The suitability of a sequence as a code word and, correspondingly, as a reference is determined by its property whereby its autocorrelation function (i.e., correlation with itself) has a distinct, detectable extreme value; this implies that the cross-correlation function of each code word from the code word supply with this reference has in each case a distinct, detectable extreme value, the position of the extreme value being characteristic of the individual code word.

To produce the code words, one preferred embodiment of the present invention provides for an m-sequence, a Barker code, a Gordon Mills Welch (GMW) sequence or a Gold code to be used. It is likewise conceivable for analog signals to be used as code words, for example time-limited, frequency-modulated sinusoidal signals.

Also conceivable is the use of complex code words. These are first divided into real and imaginary parts by assigning one code word each to the real and imaginary parts. Following transmission of the sum word formed from combination results representing the real and imaginary parts, respectively, a breakdown in reverse according to real and imaginary parts is carried out correspondingly based on the assignment of the data position-specific code words. In this regard, one advantageous embodiment of the method according to the present invention provides for the code words to be formed by cyclical shifting of a CCK (complementary code keying) code.

In accordance with one preferred refinement of the present invention, the data word contains unipolar dual values. This has the advantage of a relatively simple implementation in terms of circuit engineering. However, in the case of a "zero word" as a data word (i.e., all data positions contain the datum "0"), a transmission without modulation is disadvantageous because the sum word is without energy in this case.

In such cases, it is preferably provided for the data word to contain dual, bipolar values. Thus, in addition, the transmission is significantly more immune to interference.

It is also preferable for the data word to be based on a ternary or higher base number system. This advantageously renders possible an even higher data transmission rate, the signal-to-noise ratio decreasing and interference susceptibility increasing correspondingly in the process, however. Therefore, depending on the conditions of the individual case (for example, required interference immunity, performance, and length of the data transmission link), an increase in the data transmission rate may be quite beneficial when using higher base number systems. Within the scope of the present invention, a ternary number system is understood to be a base three number system, thus one whose digit positions are defined by the powers $3^0$, $3^1$, $3^2$, etc., it being possible for the coefficients to assume the values 0, 1 and 2.

For an analog implementation of the method according to the present invention, bipolar sequences are preferably used as code words, as they are known from the publication "Messtechnik für das BISDN" [Metrology for the BISDN], Dr. A. Wolf, vde publishers gmbh Berlin and Offenbach, 1992, illustration 6-13.

Claim 8 relates to an advantageous modification of the method according to the present invention in that the code word supply is made up of at least two sets of sufficiently orthogonal sequences. In this way, it is possible to further increase the code word supply and thus the transmission of sum words which represent the data words having an increased number of data positions.

The so-called "multipath fading", caused by unwanted signal propagation on secondary paths due to signal reflections, is problematic when transmitting via preferred M-PSK (multiphase shift keying) modulation. If no countermeasures are taken, this leads to a scatter diagram rotated in an I-Q diagram representation ("scatter plot") and thus to data errors on the receiver side. Substantial outlay is required to compensate for this effect in transmission methods known heretofore.

The method according to the present invention is distinguished over other known methods in that it is already extremely immune to interference in this respect.

Still problematic are, at most, data corruptions which—depending on the number base—lead to an overflow condition. In the case of a digital 4-bit word (transmitted sum word), for example, this is understood to include the change from the value (0000) to the value (1111) and vice versa. This is also described—with reference to the corresponding complex I-Q representation as a so-called vector diagram—as passing over the ("forbidden") transition line which lies in the vector diagram representation between the first and fourth quadrants. In accordance with the present invention, these interference risks may also be reduced when, in the case of the M-PSK modulation of the sum word, a higher-level M-PSK modulation stage is used than would be necessary based on the number of possible values that the sum word is able to assume. Thus, for example, in the case of a sum word that may assume maximally 31 different values per data position, a 32-level M-PSK modulation already effects an increase in the interference immunity. The interference immunity is enhanced to an even greater degree by an M-PSK modulation using 64 values (thus, to base 2, the next higher stage). In this context, to achieve a greatest possible distance to the transition line by appropriate offset application or value assignment, the individual values may be positioned in such a way that the occurring values are positioned at a great distance to the transition line.

The problem described above of "multipath fading" is also associated with undesired interference effects when working with so-called baseband transmissions (i.e., transmission without modulation of the sum word) or in transmissions that are similar to unmodulated transmissions (such as amplitude-modulated transmissions, for example).

In this regard, in accordance with one advantageous embodiment of the present invention, the sum words are provided with a cyclic extension which is dimensioned in such a way that, in spite of transmission-induced sum word interferences within the correlation window, only sum word components occur which originate from one single, original sum word.

BRIEF DESCRIPTIONS OF THE DRAWINGS

Figure 2B:
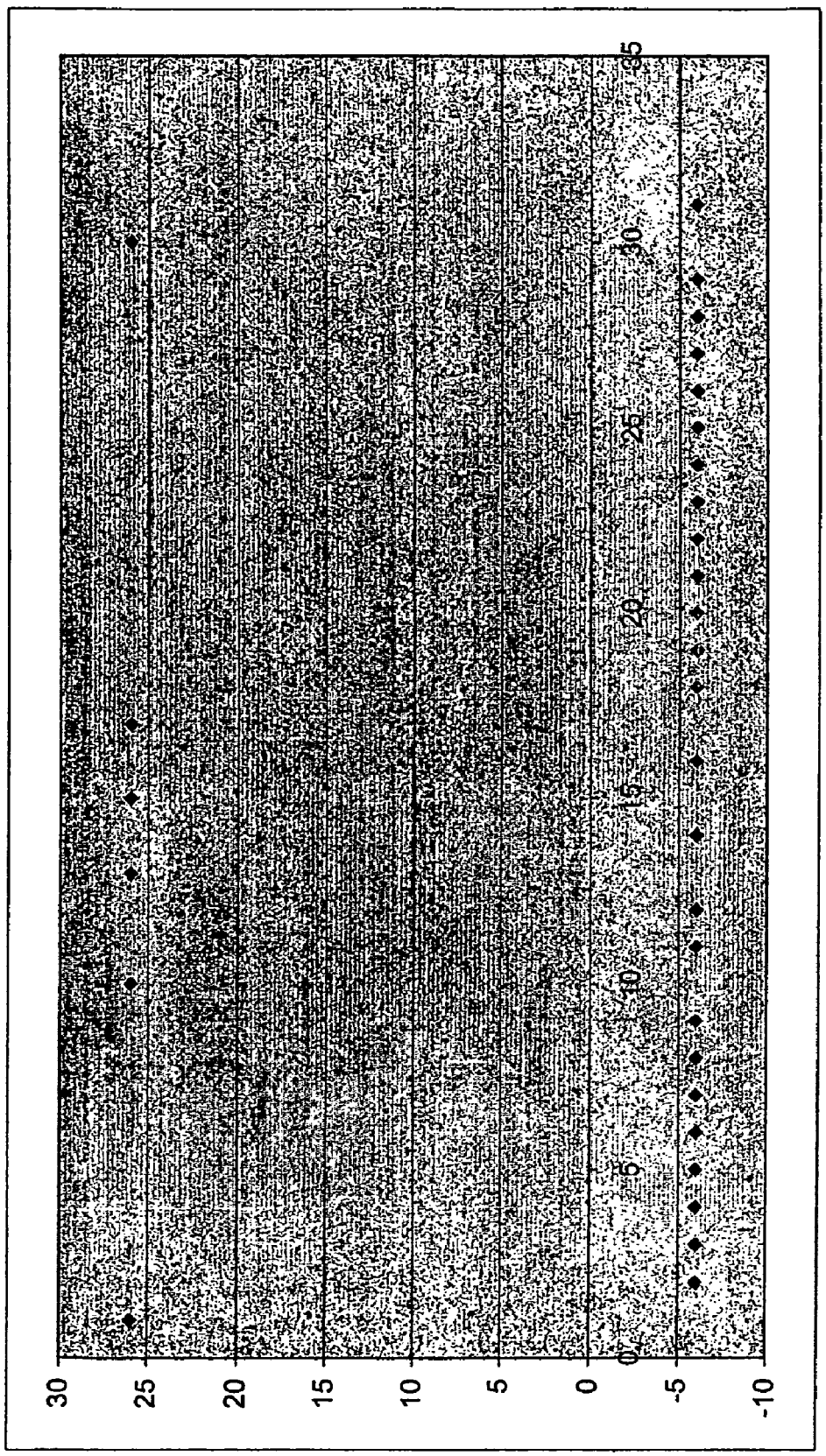
Figure 3B:
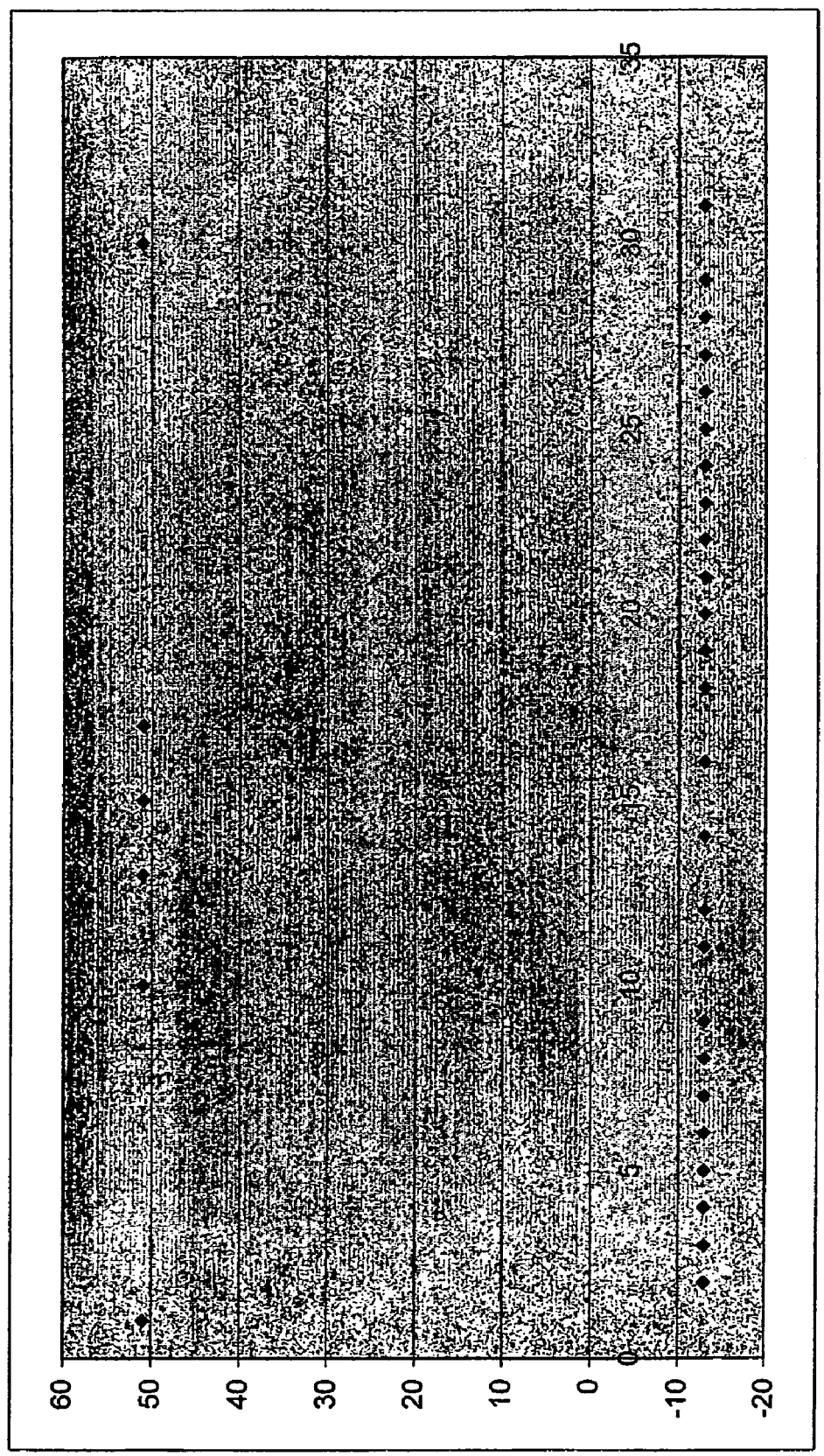
Figure 4B:
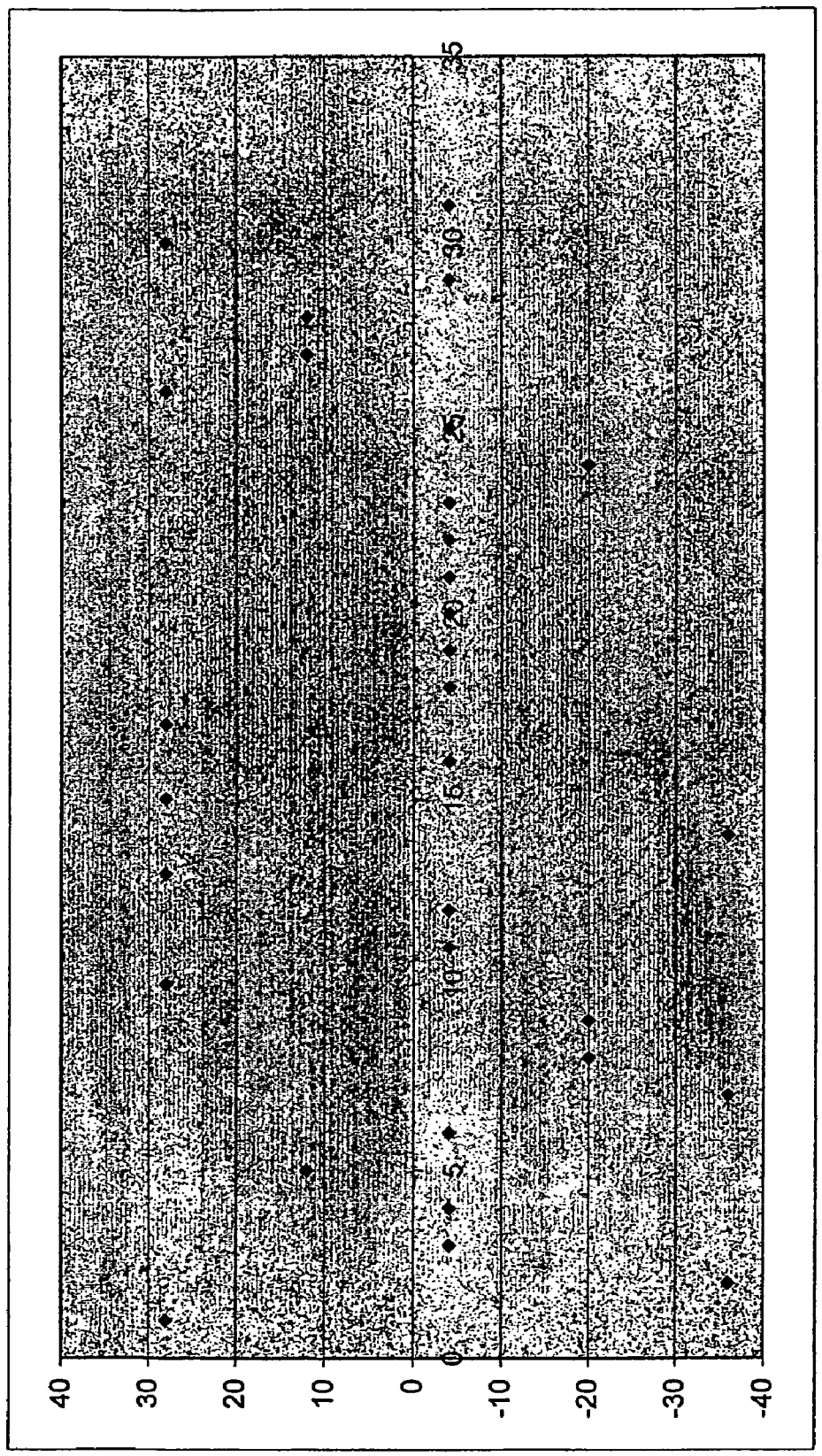
Figure 6:
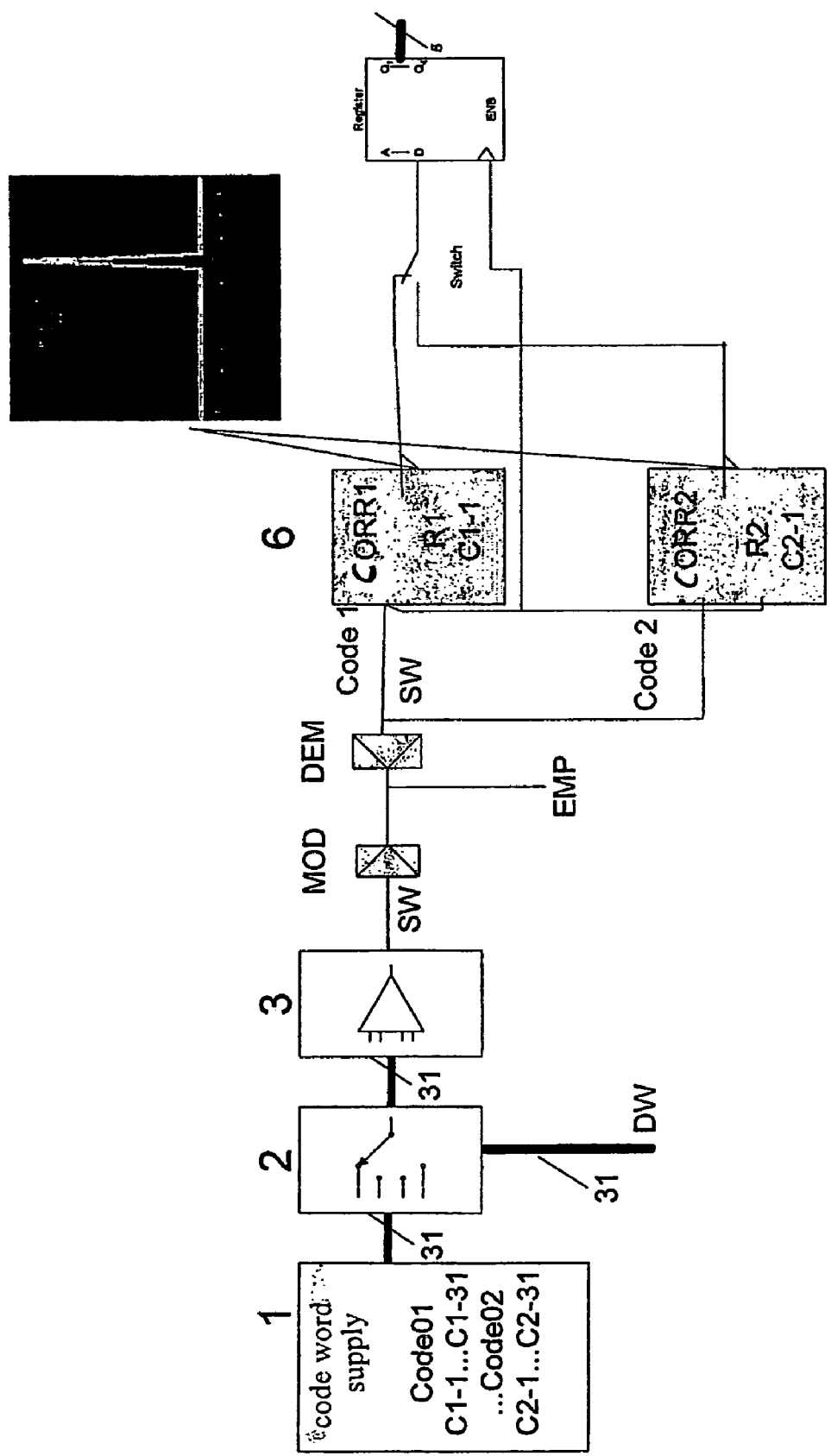
Figure 7:
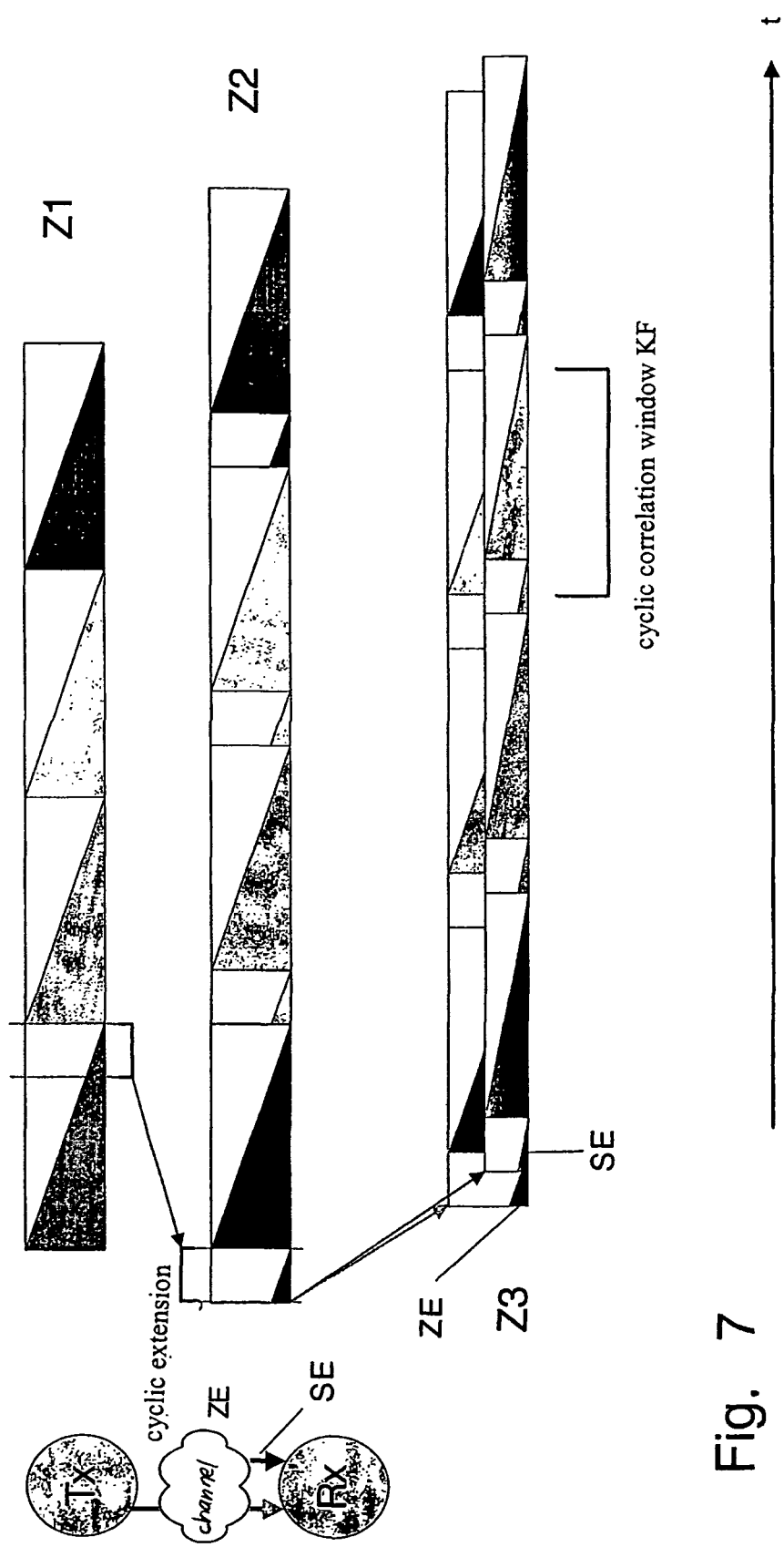

Exemplary embodiments of the present invention are explained in greater detail in the following with reference to the drawing, whose figures show:

FIG. 1, schematically, a first implementation of the method according to the present invention;

Figure 2A:
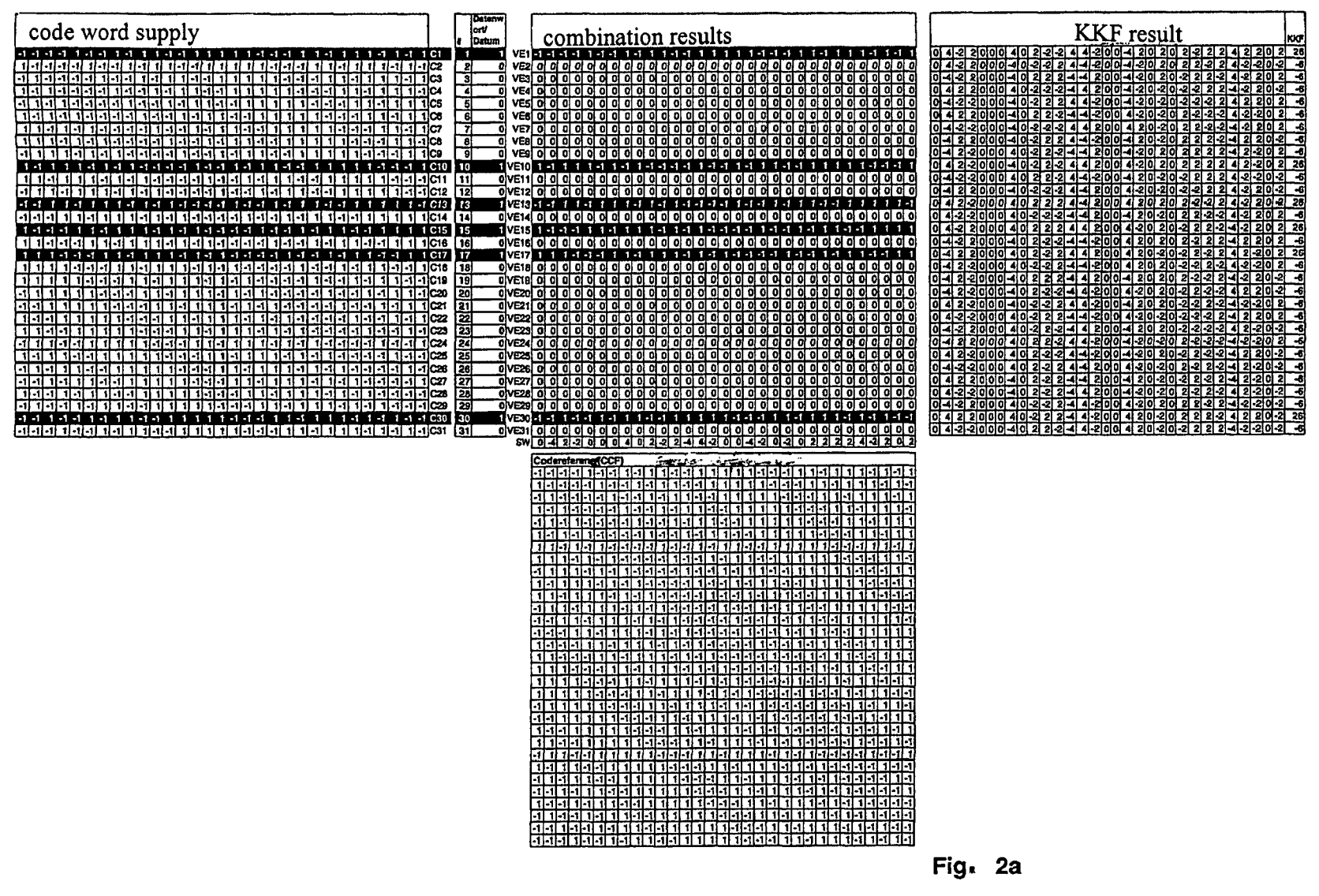

FIGS. 2*a* and 2*b* data and/or values used or generated exemplarily in the exemplary embodiment according to FIG. 1;

Figure 3A:
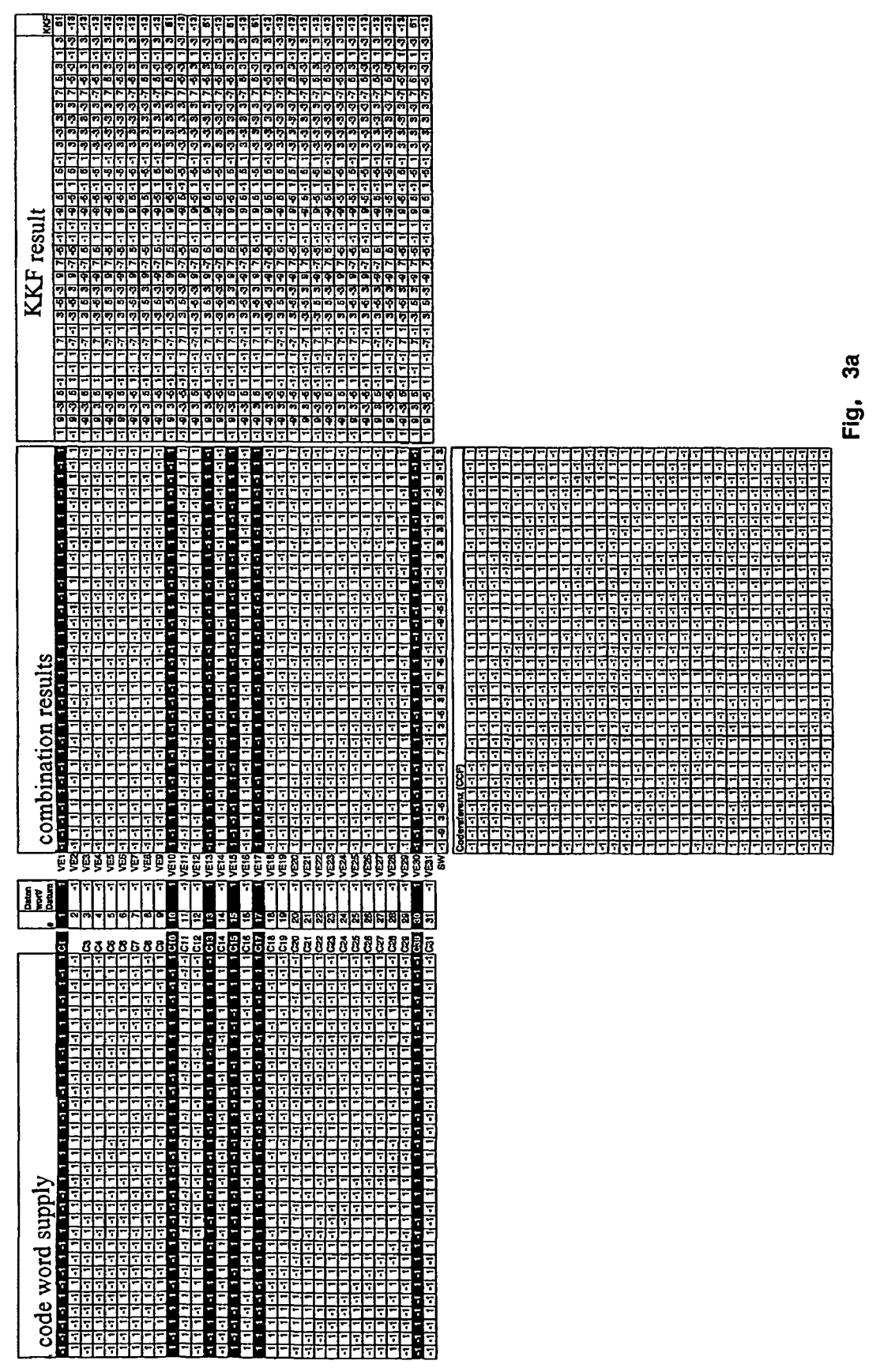

FIGS. 3*a* and 3*b* in a variation of the example according to FIGS. 2*a* and 2*b*, values resulting in the case of a bipolar data word;

Figure 4A:
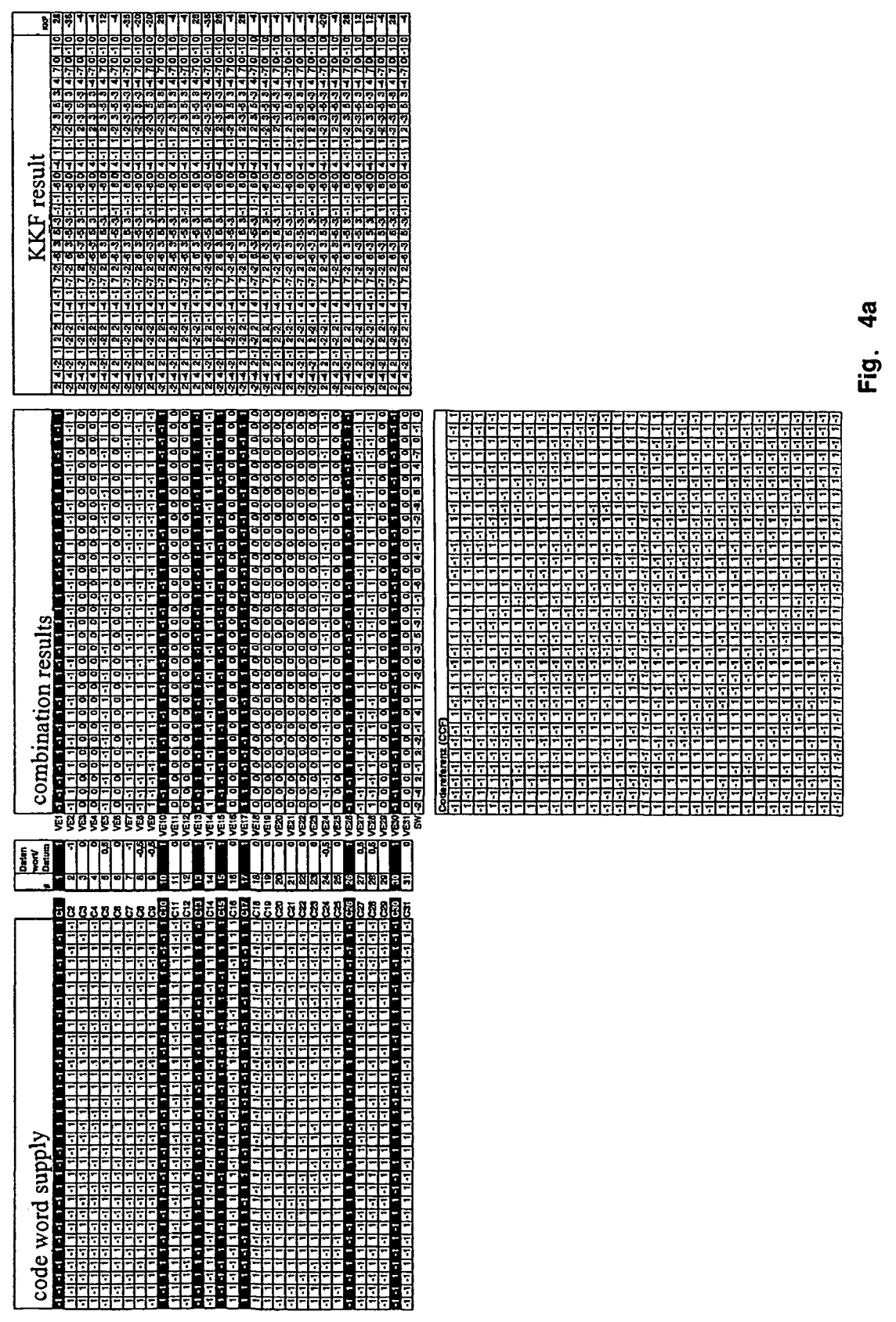

FIGS. 4*a* and 4*b* in a variation of the example according to FIGS. 2*a* and 2*b*, values resulting in the case of a data word that is based on a base five number system;

FIG. 5 in principle, the conversion of a binary number sequence (mod2) to be transmitted into a data word on a number base (mod4), for example;

FIG. 6 a further modification of the method according to the present invention in which the code word supply is made up of two sets of code words; and FIG. 7 schematically, the problem of the so-called "multipath fading" and the use of a cyclic extension.

DETAILED DESCRIPTION

FIG. 1 shows schematically one implementation of the method according to the present invention. A detailed tabulation of the data and values that are used and generated, respectively, is provided in FIGS. 2*a* and 2*b*.

In a method step denoted by 1, a code word supply CV (here having exemplarily 31 code words C1 through C31) is initially provided. Code words C2 through C31 are formed by cyclic 1-bitwise shifting of a preferably bipolar m-sequence as basic code word C1 having the bit sequence

```
-1 -1 -1 -1  1 -1 -1  1 -1  1  1 -1 -1  1  1  1  1  1  1 -1 -1 -1  1  1 -1  1  1  1 -1  1 -1  1
```

In principle, a unipolar m-sequence could also be used; in such a case, in place of the particular value (−1), value (0) would be provided. As is illustrated in detail in FIG. 2a in the table "code word supply", code word C2 is formed by cyclical shifting in that the first bit (−1) of code word C1 was shifted to the last place and the remaining bits were advanced correspondingly by one place. The generation of such m-sequences is known per se and is described in detail, for example, in the publication "Messtechnik für das BISDN" [Metrology for the BISDN], Dr. A. Wolf, vde publishers gmbh Berlin and Offenbach, 1992, Chapter 5 ff.

It is characteristic of code words C1 through C31 that their cross-correlation function with the basic code word (or another code word of the code word supply) —referred to in the following as reference—in each case has a distinct, detectable extreme value, the position of the extreme value being characteristic of the individual code word (and the selected reference).

FIG. 1 also shows schematically a data word DW, which has 31 individual bit positions (also referred to generally in the following as data positions, with regard to data words that are not to be transmitted digitally) #1 through #31 (FIG. 2a). In this example, the data word is based on a unipolar dual number system (0; 1) and the following bit sequence:

```
1 0 0 0 0 0 0 0 0 1 0 0 1 0 1 0 1 0 0 0 0 0 0 0 0 0 0 0 0 1 0
```

As shown in FIG. 2a, each data position #1 through #31 has precisely one single, individual and thus distinguishable code word assigned to it uniquely and in a fixed manner, at least for the transmission of a data word. For example, assigned to data position #5 (having the current datum (0)) is code word C5 having the bit sequence:

```
-1  1 -1  1 -1 -1 -1 -1 -1 -1 -1  1 -1  1  1 -1 -1  1  1  1  1  1  1 -1 -1 -1  1  1 -1  1  1  1
``` assigned to data position #10 (having the current datum (1)) is code word C10 having the bit sequence:

```
1 -1  1  1  1 -1 -1 -1 -1 -1 -1 -1  1 -1 -1  1  1 -1 -1  1  1  1  1  1  1 -1 -1 -1  1  1 -1
```

In a method step denoted by 2, multiplicatively combined with datum D of each data position #1 through #31 is, at this point, the code word assigned to this particular data position. The combination results VE1 through VE31 in question are shown in detail in FIG. 2a. Thus, for example, multiplicatively combining datum D1 (value=(1)) of data word DW with assigned code word C1 yields combination result VE1 having the bit sequence:

```
-1 -1 -1 -1  1 -1 -1  1 -1  1  1 -1 -1  1  1  1  1  1  1 -1 -1 -1  1  1 -1  1  1  1 -1  1 -1  1
```

Thus, for example, multiplicatively combining datum D2 (value=(0)) of data word DW with assigned code word C2 yields combination result VE2 having the bit sequence:

```
0 0 0 0 0 0 0 0 0 0 0 0 0 0 0 0 0 0 0 0 0 0 0 0 0 0 0 0 0 0 0
```

A multiplicative weighting of code word C2 with value (0) of datum D2 yields a zero sequence.

In a method step denoted by 3, the data position-specific combination results are summed, forming a sum word SW. To that end—as in the exemplary embodiment of the digital implementation of the method—the bits of the same bit position from all of the combination results are summed. As illustrated in FIG. 2, the summation of the first bits in each case (illustrated in the decimal system) yields value (0), of the second bits, (−4), etc.

Sum word SW formed in this manner, thus likewise having 31 data positions, is modulated, if indicated, in a generally known manner by a modulator MOD and transmitted via a—radio link, for example—transmission link ST to a receiver EMP, and demodulated on the receiver side by a demodulator DEM.

The transmission may also take place without modulation (as a so-called baseband transmission), as also discussed in the following.

In a method step denoted by 4, received sum word SW, shown merely symbolically in FIG. 1, is cross-correlated with a reference R via a correlator KORR. To that end, as is apparent in detail in FIG. 2, received sum word SW is cyclically correlated with the reference, and the values of cross-correlation function KKF are extracted therefrom (FIG. 2). The reference may be the basic code word or, however, also a sequence formed by cyclical shifting of the basic code word.

In the example in accordance with FIG. 2a, basic code word C1 is used as a reference; the cross-correlation is carried out on a bit-position basis in that sum word SW is shifted bitwise with respect to the reference. Virtually synonymous with this is the shifting of the reference bitwise with respect to the unshifted sum word SW and the bitwise multiplication of the same, as is indicated under the heading "code reference CCF", for the sake of a simplified representation in FIG. 2.

The data position-specific multiplication of the sum word with the reference yields the values of cross-correlation function (KKF) indicated in detail in FIG. 2a. These values have positive extreme values (26) (maxima) always at those data positions where the assigned code word was originally weighted (multiplied) with the largest value of the value set of the data word, namely datum (1). The values exhibit a minimum (−6) at those data positions where the assigned code word was originally weighted (multiplied) with the smallest value of the value set of the data word, namely datum (0). In the present case of a binary value set for the data word, there are naturally only these two extreme values, and the assignment is possible using the simplest evaluation.

Thus, in a method step denoted by 5, it is possible to infer the value originally contained in the data word to be transmitted, at the particular data position. In the exemplary embodiment, at every data position where there is a maximum (here: (26)) of cross-correlation KKF, value (1) is reconstructed and, correspondingly, in each case value (0) at the remaining data positions having the minimum (−6).

Thus, the function curve results, as illustrated graphically in FIG. 2b under the heading "KKF function (discrete)". In addition to the explicit representation in FIG. 2b, this function curve is indicated schematically in FIG. 1 by the caption "unipolar".

Schematically sketched in FIG. 1 with the caption "bipolar" is also a transmission which is based on a bipolar data base of the data word. In this case, data values (0) of the preceding example would also be replaced by values (−1). This has the advantage of an improved interference immunity and also ensures that there is no occurrence of a zero word to be transmitted as a sum word SW and, thus, that there is no occurrence of a signal without energy, even when a data word is transmitted, whose individual data would all be "0" in the unipolar representation. Specifically, the values shown in detail in FIG. 3a result in this case of a bipolar data word. In the result, the cross-correlation function (KKF) (compare also the graphic representation in FIG. 3b) likewise shows clearly detectable maxima (here: (51)) at each data position, whose assigned code word was originally weighted with (multiplied by) datum (1) and minima (−13) at those data positions where the assigned code word was originally weighted with (multiplied by) the datum (0).

The transmitted data rate is able to be further increased correspondingly when the data word is based on a higher base number system. This is illustrated exemplarily in FIGS. 4a, 4b for a data word which contains values (−1), (−0.5), (0), (+0.5) and (+1) and is thus based on a base five number system.

In data positions #1 through #31, the assumed data word contains the discrete values ---
(1), (−1), (0), (0), (0.5), (0), (−1), (−0.5), (−0.5), (1), (0), (0) ... etc . . . (1), (0) (compare FIG. 4a).
---

From this, sum word SW is derived, following multiplicative combining with the particular assigned code word C1 through C31 and subsequent summation:

---
−2 −4 2 −1 2 −2 −1 4 1 7 −2 6 −3 5 −3 −1 −1 −6 0 4 −1 1 −2 −3 5 3 4 −7 0 −1 0
---

In this exemplary embodiment, the sum word is made up of a discrete number sequence; however, an analog signal may also be used for the transmission.

The received sum word is cross-correlated with the reference (for example C1), as described above, and yields the discrete values apparent in column KKF. In this context, absolute maximum (28) corresponds to the largest value—namely (1)—of the value set of the data word; absolute minimum (−36) to the smallest value—namely (−1)—of the value set of the data word. From the knowledge of the absolute extreme values, it is now possible to deduce how the remaining values of the cross-correlation function are to be assigned to corresponding values of the value set of the data word. One possibility for implementing this is the formation of a band of values, starting from the absolute extreme values. The bands of values may, in this context, also advantageously extend beyond the absolute extreme values, in order to also contain ("capture") any data transmission errors above or below the absolute extreme values (in the case of an error-free transmission). In the present example, starting out from the difference in the absolute extreme values (namely 28−(−36)=64), this span could be subdivided into four preferably same bands having a width of 64/4=16. The bands would then have the following ranges in order to "capture" transmission errors:

| Band | Range of values | Includes value (x) of the data word |
|---|---|---|
| 1 | −44 to −28 | (−1) |
| 2 | −27 to −12 | (−0.5) |
| 3 | −11 to +4 | (0) |
| 4 | +5 to +20 | (+0.5) |
| 5 | +21 to +36 | (+1) |

Thus, one recognizes that it is possible to infer all data of the data word from the relative position of the values of the cross-correlation function and by evaluating the extreme values. Thus, value (0.5) of the value set of the data word is assigned to value (12) of the cross-correlation function; value (0) is assigned to value (4) and value (−0.5) of the data word at the particular data position is assigned to value (−20).

The information required for the above described assignments may be made available, for example, by reserving data positions for information in this regard in each data word. Thus, for example, the first two data positions of a digital data word, for example, could be filled with the highest and, respectively, lowest value of the value set provided for the data word. However, corresponding assignment tables may also be stored on the receiver side, which, with the knowledge of the (constant) priority of the data words used, undertake such a (band-wise) assignment from the occurring extreme values.

Discernible in the graphic representation of the KKF function in FIG. 4b, are still clearly identifiable extreme values, whose distance is reduced, however, in comparison to the preceding examples. Thus, it is apparent that the increase in the transmittable data rate is at the expense of the signal-to-noise ratio and thus of the interference immunity. However, there are many application cases, in particular short transmission links, where this signal-to-noise ratio is perfectly adequate.

On the other hand, the data rate is advantageously substantially increased in that, as schematically shown in FIG. 5, a binary number sequence of a word to be transmitted is converted from mod2 to mod4, for example, thereby compressing the data transmission.

FIG. 6 shows a further modification of the method according to the present invention. Here, essentially the same method steps are carried out as described in connection with FIG. 1, however using a code word supply which is made up of two sets of code words, code 01 and code 02. The sets of code words are composed of mutually orthogonal sequences. The orthogonality effects that the cross-correlation function of code words C1-1 through C1-31 of the first set code 01 with one another and the cross-correlation function of code words C2-1 through C2-31 of the second set code 02 with one another in each case have a distinct, detectable extreme value. On the other hand, the cross-correlation function of code words C1-1 through C1-31 of the first set code 01 with code words C2-1 through C2-31 of the second set does not exhibit a distinct, detectable extreme value. The code words of each set are formed, as described, by cyclically shifting a particular basic code word set of the first and, respectively, second set code 01 and, respectively, code 02, as described above, the number of individual codes words of the supply corresponding altogether to at least the number of data positions of the data word.

As FIG. 6 schematically shows, in addition, received sum word SW is supplied in parallel to two correlators KORR1, KORR2 in a method step 6. As described in detail, correlator KORR1 carries out a cross-correlation with a reference R1; the reference may be the basic code word of the set code 01 or also a sequence formed by cyclically shifting this basic code word. In the example, basic code word C1-1 is used as a reference. In parallel thereto, correlator KORR2 carries out a cross-correlation with a reference R2 which corresponds to basic code word C2-1 of the set code 02. Due to the orthogonality of code sets code 01 and code 02, only one of the cross-correlations yields a distinct maximum in each case, namely when taking the reference as a basis which corresponds to the basic code word of the set from which the code word assigned to the particular data position was selected. The remaining evaluation is carried out as described above. Thus, transmission is able to be carried out at an altogether higher rate.

FIG. 7 schematically illustrates the difficulty associated with the so-called "multipath fading", which can also cause undesired interference effects SE when working with so-called baseband transmissions between a transmitter Tx and a receiver Rx (i.e., transmission without modulation of the sum word) or in transmissions that are similar to unmodulated transmissions (such as amplitude-modulated transmissions, for example). Due to undesired reflections, the sum words illustrated schematically in row Z1 lead to superimposed signals SE, as illustrated in row Z2. At this point, in accordance with the present invention, these signals are provided with a cyclic extension ZE of the particular sum word that is dimensioned in such a way that, in spite of transmission-induced sum word interferences within the correlation window KF, only sum word components occur which originate from one single, original sum word.

What is claimed is:

1. A method for transmitting a data word containing a sequence of individual data in sequential data positions, the method comprising:

making a code word supply available, a number of individual codes words of the supply corresponding at least to the number of data positions of the data word, a cross-correlation function of each code word with a specific reference having in each case a distinct, detectable extreme value having a position is characteristic of the individual code word;

assigning an individual code word of the number of code words to each data position of the data word;

combining the assigned code word with the particular datum of the data position so as to form a data position-specific combination result;

summing the data position-specific combination results to form a sum word;

transmitting the sum word to a receiver;

cross-correlating the received sum word with a further reference, the further reference, when cross-correlated with each code word, having in each case a distinct, detectable extreme value having a position being characteristic of the individual code word; and reconstructing from the position and magnitude of the values of the thus formed correlation function, the particular data position-specific data of the data word in that, following the fixed assignment, a corresponding datum is assigned to each value;

wherein the sum words are provided with a cyclic extension dimensioned so that, in spite of transmission-induced sum word interferences within a correlation window, only sum word components occur which originate from one single, original sum word.

2. The method as recited in claim 1 wherein the code words are formed by cyclical shifting of an m-sequence, a Barker code, a Gordon Mills Welch (GMW) sequence or a Gold code.

3. The method as recited in claim 1 wherein the code words are formed by cyclical shifting of a complementary code keying code.

4. The method as recited in claim 1 wherein unipolar dual values (0,1) are permitted for the data word.

5. The method as recited in claim 4 wherein bipolar dual values (1,−1) are used for the code word.

6. The method as recited in claim 4 wherein unipolar dual values (0,1) are used for the code word.

7. The method as recited in claim 1 wherein bipolar dual values (−1,1) are permitted for the data word.

8. The method as recited in claim 1 wherein ternary or higher base number systems being permitted for the data word.

9. The method as recited in claim 1 wherein bipolar sequences are used as code words.

10. The method as recited in claim 1 wherein the sum word is modulated for transmitting multiphase shift keying and, in the process, a multiphase shift keying modulation stage is used that is of a higher level than would be necessary based on the number of possible values that the sum word is able to assume.

11. A method for transmitting a data word containing a sequence of individual data in sequential data positions, the method comprising the steps of:

making a code word supply available, a number of individual codes words of the supply corresponding at least to a number of data positions of the data word;

using as the code words at least two sets of sufficiently orthogonal sequences so that a cross-correlation function of code words of the first set with a specific first set reference has a distinct, detectable extreme value and a cross-correlation function of code words of the second set with a specific second set reference has a second distinct, detectable extreme value, a position being characteristic in each case of the individual code word of the particular code word set, the first cross-correlation function of the code words of the first set with the second set reference of the second set and the second cross-correlation function of code words of the second set with the first set reference not having any distinct, detectable extreme value;

assigning an individual code word of the number of code words to each data position of the data word;

combining the assigned code word with the particular datum of the data position, forming a data-position specific combination result;

summing the data position-specific combination results to form a sum word;

transmitting the sum word to a receiver;

cross-correlating the received sum word in each case with a first and a second set receiving reference, the cross-correlation function of the code words of the first set with the first set receiving reference having a distinct, detectable extreme value; and the cross-correlation function of code words of the second set with the second set receiving reference having a distinct, detectable extreme value having a position being characteristic in each case of the individual code word of the particular code word set; and reconstructing from the position and magnitude of the values of the thus formed correlation functions, the particular data position-specific data of the data word in that, following the fixed assignment, a corresponding datum is assigned to each value.

12. The method as recited in claim 11 wherein the sum word is modulated for transmitting multiphase shift keying and, in the process, a multiphase shift keying modulation stage is used that is of a higher level than would be necessary based on the number of possible values that the sum word is able to assume.

13. The method as recited in claim 11 wherein the sum words are provided with a cyclic extension dimensioned so that, in spite of transmission-induced sum word interferences within a correlation window), only sum word components occur which originate from one single, original sum word.

* * * * *